United States Patent
Rizkin et al.

[11] Patent Number: 5,842,767
[45] Date of Patent: Dec. 1, 1998

[54] HIGHLY EFFICIENT ILLUMINATOR AND METHOD OF USE THEREOF

[75] Inventors: Alexander Rizkin, Rendondo Beach; Ilya Agurok, Long Beach, both of Calif.

[73] Assignee: farLight Corporation, Torrance, Calif.

[21] Appl. No.: 815,145

[22] Filed: Mar. 11, 1997

[51] Int. Cl.$^6$ .................................. F21V 8/00; F21V 7/02
[52] U.S. Cl. ........................... 362/32; 362/346; 362/298; 362/343; 362/297
[58] Field of Search ............................ 362/32, 346, 298, 362/343, 297

[56] References Cited

U.S. PATENT DOCUMENTS

| | | | |
|---|---|---|---|
| 4,956,759 | 9/1990 | Goldenberg et al. | 362/297 |
| 5,161,874 | 11/1992 | Benes | 362/32 |
| 5,309,339 | 5/1994 | Webb | 362/259 |
| 5,317,484 | 5/1994 | Davenport et al. | 362/32 |
| 5,428,509 | 6/1995 | Dassanayake | 362/32 |
| 5,436,806 | 7/1995 | Kato | 362/32 |
| 5,469,337 | 11/1995 | Cassarly et al. | 362/32 |
| 5,479,545 | 12/1995 | Davenport et al. | 362/32 X |
| 5,491,620 | 2/1996 | Winston et al. | 362/346 |
| 5,515,242 | 5/1996 | Li | 362/32 |
| 5,567,031 | 10/1996 | Davenport et al. | 362/32 |
| 5,695,277 | 12/1997 | Kim | 362/299 |

Primary Examiner—Ira S. Lazarus
Assistant Examiner—David B. Lee
Attorney, Agent, or Firm—Nilles & Nilles, S.C.

[57] ABSTRACT

Systems and methods for high efficiency illuminators are described. An illuminator includes an elliptical reflector defining a first focal point, a second focal point, a first focal plane and a second focal plane, the first focal point and the second focal point defining a principle axis; an output coupler optically coupled to the elliptical reflector, the output coupler including a first proximal end and a first distal end, the first proximal end defining an output coupler axis that is substantially coaxial with the principle axis; and a hollow conical reflector optically coupled to the output coupler, the hollow conical reflector including a first end defining an first aperture and a second end defining a second aperture, the first aperture and the second aperture defining a hollow conical reflector axis, the hollow conical reflector being positioned such that i) the hollow conical reflector axis is substantially coaxial with the principle axis and ii) a plane defined by the input aperture is substantially coincident with the second focal point, the second end of the hollow conical reflector being mechanically connected to the proximal end of the output coupler. The systems and methods provide advantages in that the efficiency of coupling between the light source and the coupler is substantially improved, albeit through an opening formed between the conical and spherical reflectors that is of smaller diameter than that of the coupler.

23 Claims, 9 Drawing Sheets

HIGHLY EFFICIENT ILLUMINATOR AND METHOD OF USE THEREOF

BACKGROUND OF THE INVENTION

1. Field of the Invention

The present invention relates in general to the field of lighting. More particularly, the present invention relates to illuminators that can be used in conjunction with remote source lighting (RSL) systems. Specifically, a preferred embodiment of the present invention relates to an illuminator whose overall efficiency is increased through the use of a hollow conical reflector and a spherical reflector. The present invention thus relates to illuminators of the type that can be termed highly efficient.

2. Discussion of the Related Developments

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

In 1880, William Wheeler was granted a patent for a mechanism for "piping" light from a central light source to a number of locations through pipes lined with a reflective coating[1]. Not until the 1970's, however, and after the successful production of the first truly low-loss, glass optical fibers with diameters about the thickness of a human hair, did remote source lighting become practical.

More recent progress in i) developing efficient light sources and ii) manufacturing optical fiber has permitted the assembly of remote source lighting (RSL) systems in which an optical fiber is used to deliver light from a light source to a remotely located point. The distal end of the optical fiber in such systems has been used for illumination directly or in conjunction with refractive lenses, to approximate the light distribution required by various applications including street lighting and automobile head lights. Nevertheless, further improvements in the performance and efficiency of the individual components of RSL systems are still desirable.

It is well known to provide a light source with an elliptical mirror to increase efficiency.[2] Referring to FIG. 1, an elliptical reflector 10 surrounds a point source $F_1$ located at a first focal point. An optical fiber 20 is located at the second focal point $F_2$ of the elliptical reflector 10. A previously recognized problem with such an arrangement has been that the efficiency of coupling from the point light source located at the inner (first) focal point $F_1$ of elliptical reflector 10 to the optical fiber 20 located at the outer (second) focal point $F_2$ of elliptical reflector 10 is limited in that the numerical aperture of the reflector must be less than or equal to the numerical aperture of the optical fiber. Therefore, the efficiency of coupling is limited by the numerical aperture of a given optical fiber and is not enhanced by increasing the numerical aperture of the reflector beyond that of the optical fiber. Of course, the numerical aperture of the elliptical reflector should be at least as high as that of the optical fiber. What is needed therefore, is a way to further increase the amount of light that is coupled from an elliptical reflector.

An additional previously recognized problem has been that each point of a non-point light source located in the plane of the first focal point of an elliptical reflector will produce a number of rays that are reflected from a range of positions with a range of reflected angles because of aberration. Consequently, a fraction of these rays will not be coupled into the optical fiber simply because they will not be reflected toward the proximal end of the optical fiber by the elliptical reflector.

For example, referring to FIG. 2, an extended light source 25 is located at a first focal point $F_1$ of elliptical reflector 30. Optical fiber 40 is located at a second focal point $F_2$ of elliptical reflector 30. Rays 3 and 4 will not be incident upon the end of the optical fiber 40 simply because they are not reflected toward the end of optical fiber 40. What is needed therefore, is a way to increase the amount of light that is coupled from an extended source.

The below-referenced U.S. patents disclose embodiments that are satisfactory for the purposes for which they were intended. The disclosures of the below-referenced prior United States patents in their entireties are hereby expressly incorporated by reference into the present application for purposes including, but not limited to, indicating the background of the present invention and illustrating the state of the art.

U.S. Pat. No. 5,436,806 discloses an illumination device. U.S. Pat. No. 5,161,874 discloses a remote illumination system. U.S. Pat. No. 5,629,996 discloses a universal remote lighting system.

SUMMARY AND OBJECTS OF THE INVENTION

By way of summary, the present invention is directed to an illuminator having a light source located near the inner focal point of an elliptical reflector and a hollow conical reflector whose input end is located near the outer focal point of the elliptical reflector. The output end of the hollow conical reflector is connected to an optical output coupler and a spherical reflector can be connected to the input end of the hollow conical reflector to increase the coupling efficiency. An unexpected beneficial effect of the present invention which is both counter-intuitive and a substantial improvement is to increase the efficiency of coupling between the light source and the coupler, albeit through an opening formed between the conical and spherical reflectors that is of smaller diameter than that of the optical output coupler.

A primary object of the invention is to provide an apparatus that can power a remote source lighting system. Another object of the invention is to provide an apparatus that is optically efficient. Another object of the invention is to provide an apparatus that is cost effective. It is another object of the invention to provide an apparatus that is rugged and reliable, thereby decreasing down time and operating costs. It is yet another object of the invention to provide an apparatus that has one or more of the characteristics discussed above but which is relatively simple to manufacture and assemble using a minimum of equipment.

In accordance with a first aspect of the invention, these objects are achieved by providing an apparatus comprising: an elliptical reflector defining a first focal point, a second focal point, a first focal plane and a second focal plane, said first focal point and said second focal point defining a principal axis. The apparatus also comprises a light source optically coupled to said elliptical reflector and located substantially at said first focal plane. The apparatus also comprises an output coupler optically coupled to said elliptical reflector, said output coupler including a first proximal end and a first distal end, said first proximal end defining an output coupler axis that is substantially coaxial with said principal axis. The apparatus also comprises a hollow conical reflector optically coupled to said output coupler, said hollow conical reflector including a first end defining a first aperture and a second end defining a second aperture, said first aperture and said second aperture defining a hollow conical reflector axis, said hollow conical reflector being positioned such that i) said hollow conical reflector axis is substantially coaxial with said principal axis and ii) a plane defined by said input aperture is substantially coincident with said second focal point, said second end of said hollow conical reflector being mechanically connected to said proximal end of said output coupler. Additionally, the apparatus can also comprise a first order spherical reflector optically coupled to said elliptical reflector, said first order spherical reflector including a first order input end defining a first order input aperture and a first order output end defining a first order output aperture, said first order input aperture and said first order output aperture defining a first order spherical reflector axis, said first order spherical reflector being positioned such that i) said first order spherical reflector axis is substantially coaxial with said principal axis and ii) a plane defined by said first order output aperture is substantially coincident with said second focal point, said first order output end of said first order spherical reflector being mechanically connected to said first end of said hollow conical reflector.

In one embodiment, the apparatus further comprises a second order spherical reflector optically coupled to said elliptical reflector, said second order spherical reflector including a second order input end defining a second order input aperture and a second order output end defining a second order output aperture. Said second order input aperture and said second order output aperture define a second order spherical reflector axis, and said second order spherical reflector are positioned such that i) said second order spherical reflector axis is substantially coaxial with said principal axis and ii) a plane defined by said second order output aperture is substantially coincident with a plane defined by said first order input aperture. In this embodiment, said second order output end of said second order spherical reflector is mechanically connected to said first order input end of said first order spherical reflector.

Another object of the invention is to provide a method that can be used to power a remote source lighting system. It is another object of the invention to provide a method that is predictable and reproducible, thereby decreasing variance and operating costs. It is yet another object of the invention to provide a method that has one or more of the characteristics discussed above but which is relatively simple.

In accordance with a second aspect of the invention, these objects are achieved by providing a method comprising providing the apparatus as part of a remote source lighting system and illuminating the light source. In one embodiment, the method further comprises deilluminating the light source; and repeating the steps of illuminating and deilluminating.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which.

DESCRIPTION OF PREFERRED EMBODIMENTS

Figure 1:
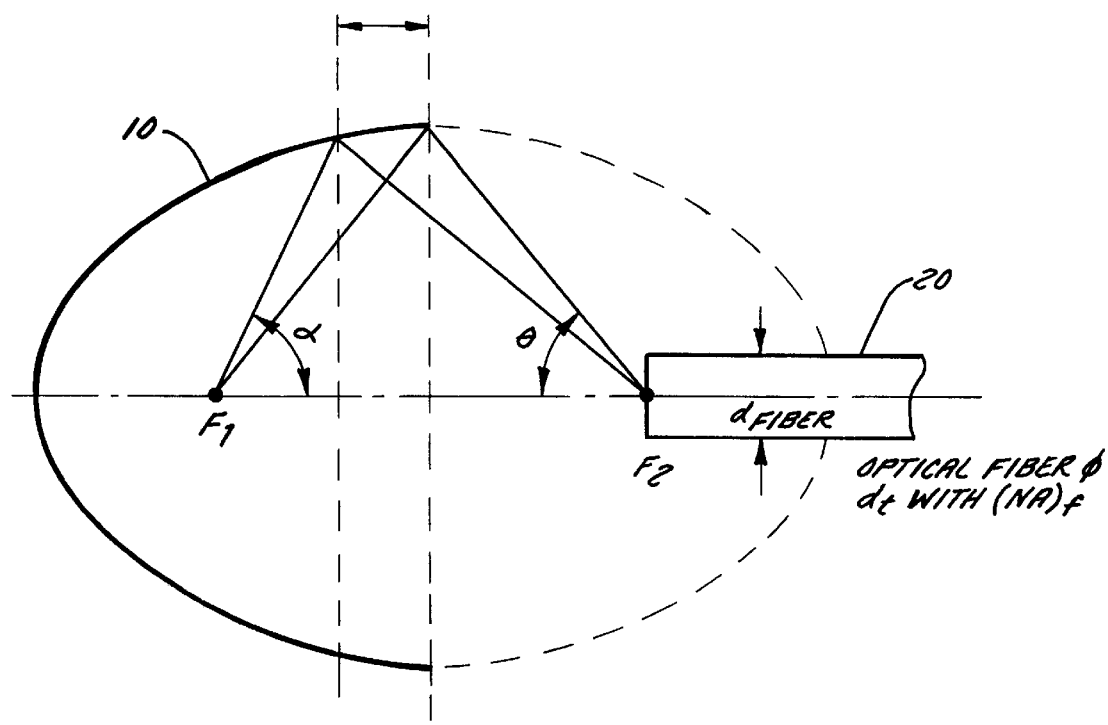
FIG. 1 illustrates a schematic cross sectional view of a conventional lamp with a point light source appropriately labeled "PRIOR ART"
Figure 2:
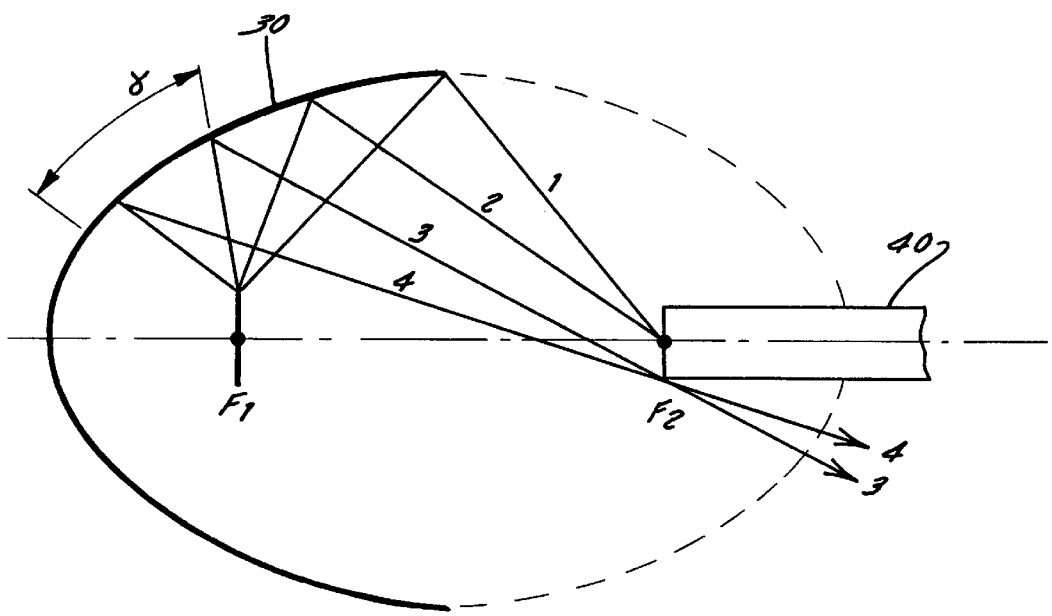
FIG. 2 illustrates a schematic cross sectional view of a conventional lamp with an extended light source appropriately labeled "PRIOR ART"

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The above-mentioned requirements of high efficiency, good thermal management and low lossyness are mutually contradicting and cannot be satisfied simultaneously in the case of a conventional light source. However, it is rendered possible to simultaneously satisfy these requirements to a certain extent by employing an illuminator according to the present invention in consideration of the fact that the outer focal point of the elliptical reflector is the location of a junction between a hollow conical reflector and a spherical reflector.

2. Detailed Description of Preferred Embodiments

Referring to the drawings, it can be seen that the illuminator is substantially cylindrically symmetric about an optic axis. It should be noted that the features illustrated in the drawings are not necessarily drawn to scale.

Figure 3:
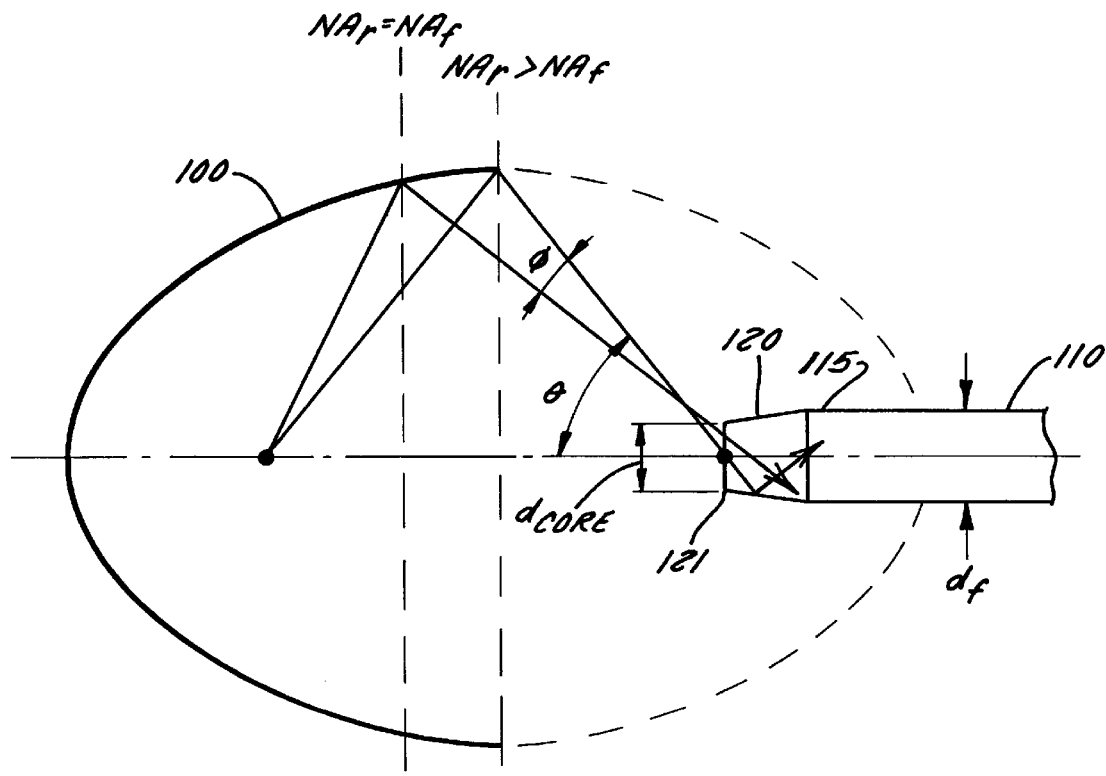
FIG. 3 illustrates a schematic cross sectional view of a first embodiment of an illuminator having a hollow conical reflector according to the present invention.

Referring now to FIG. 3, a first embodiment of an illuminator according to the present invention includes an elliptical reflector 100 having first and second focal points. A hollow conical reflector 120 is located at the second focal point of the elliptical reflector 100. In a preferred embodiment, the first end 121 of hollow conical reflector 120 is located so as to intersect the second focal point of elliptical reflector 100. The numerical aperture of elliptical reflector 100 can be increased to advantage because the proximal end of an optical fiber 110 is provided with hollow conical reflector 120. It will be appreciated that a wider angular range of light rays from the elliptical focus within the elliptical reflector 100 will be conducted to, and injected into, the optical fiber 110. Without hollow conical reflector 120, light rays within the section labeled φ would pass beyond the proximal end of fiber optic 110. In the preferred embodiment, first end 121 with a diameter $d_{cone}$ is positioned so as to admit light rays within the portion labeled θ. Reflector 120 has a second end 122 connected to optical fiber 110, thereby defining an optical output coupler 115. The optical output coupler 115 can be integrated with, or be a part of, optical fiber 110. Light rays reflected by the internal surface of hollow conical reflector 120 are injected into optical fiber 110 because they are collimated by the slope of the internal wall of the hollow conical reflector 120 in accordance with the Liouville Theorem. In order for collimation to occur, the diameter of the second end 122 and the optical fiber 110 $d_f$ must both be greater than the diameter $d_{cone}$ of the first end 121 of the hollow conical reflector 120.

Figure 4:
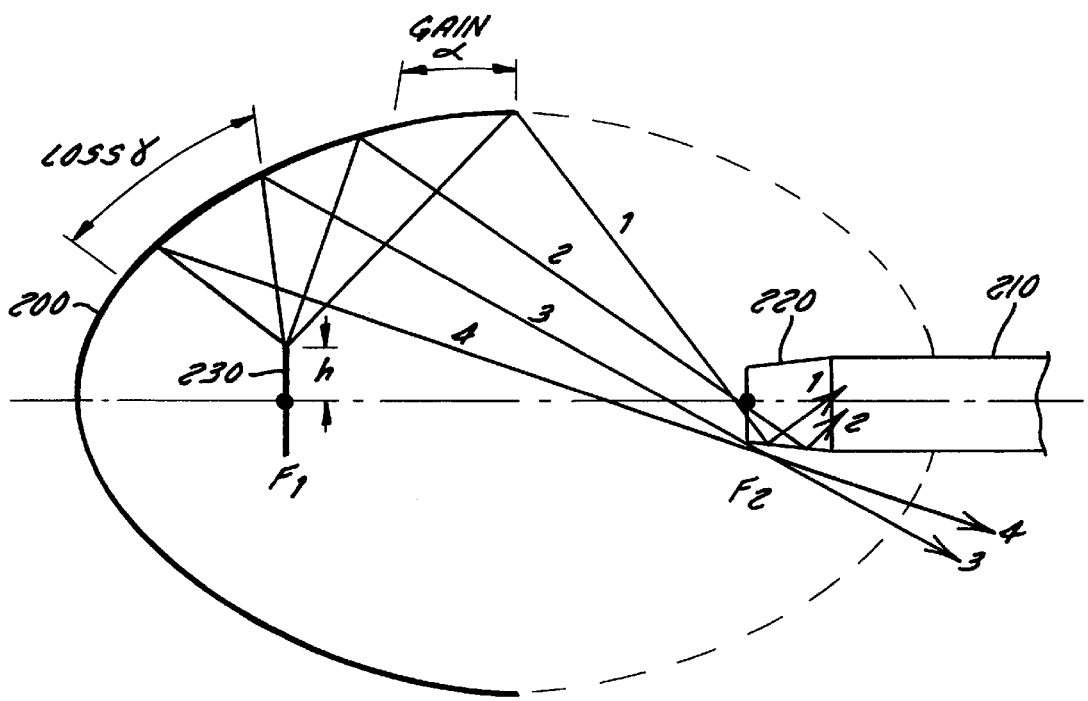
FIG. 4 illustrates a schematic cross sectional view of a second embodiment of an illuminator having a hollow conical reflector according to the present invention.

Referring now to FIG. 4, an extended source 230 is positioned at a first focal point $F_1$ of elliptical reflector 200. A hollow conical reflector 220 is positioned near, or at, a second focal point $F_2$ of the elliptical reflector 200. Extended source 230 (analogous to an actual source) will cast a plurality of rays incident upon the cord γ of the elliptical reflector 200 that are not reflected through the first end of the hollow conical reflector. All of light rays 1–4 emanate from the upper end point of extended source 230. This upper end point is displaced from the optical axis by a distance h. Light rays 1 and 2 are reflected by section α of the elliptical reflector 200 and subsequently reflected by the inner surface of hollow conical reflector 220. Light rays 1 and 2 are injected into optical fiber 210 in accordance with the Liouville Theorem. Thus, the portion a of the elliptical reflector 200 provides an increase in efficiency.

In contrast, light rays 3 and 4 are reflected by portion y of elliptical reflector 200 and pass beyond the proximal end of optical fiber 210 without being reflected by hollow conical reflector 220. In view of the fact that any real light source will be an extended source, it is preferred that the invention include additional reflective structure for harvesting light rays reflected by portion γ.

Figure 5:
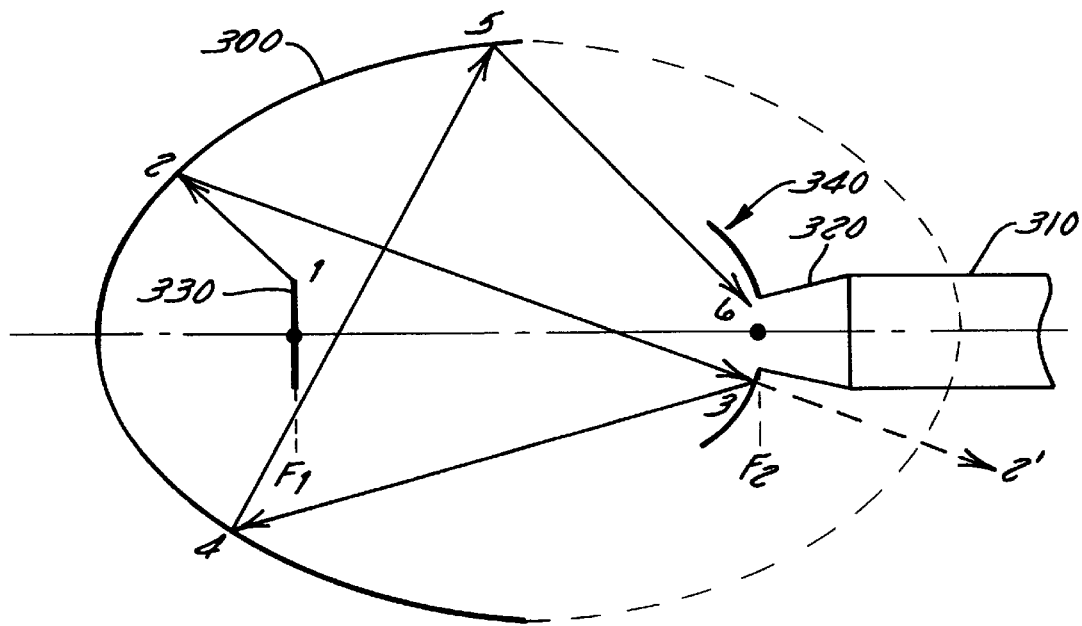
FIG. 5 illustrates a first schematic cross sectional view of a third embodiment of an illuminator having a hollow conical reflector and a spherical reflector according to the present invention.

Referring now to FIG. 5, an extended light source 330 is located at a first focal point $F_1$ of elliptical reflector 300. A hollow conical reflector 320 is located at, or near, a second focal point $F_2$ of elliptical reflector 300. A spherical reflector 340 is operationally connected to hollow conical reflector 320. The overall efficiency of the system will be further enhanced because a spherical mirror 340 is operably connected to the perimeter of the aperture defined by the first end of hollow conical reflector 320. As in the previously described embodiment, light from extended source 330 which directly enters the interior portion of hollow conical reflector 320 will be injected into optical fiber 310 in accordance with the Liouville Theorem.

Light from the upper end point of extended source 330 which would otherwise not be harvested is reflected by spherical mirror 340. For example, a light ray emitted at point 1 and traveling in a direction to point 2 is reflected by elliptical mirror 300 to point 3 on spherical mirror 340. This light ray, which would otherwise pass on in a direction labeled 2' is reflected by spherical mirror 340 to a point 4 on elliptical mirror 300. The light is subsequently reflected to a point 5 on elliptical mirror 300 and then toward a point 6 which is located within the aperture defined by the first end of hollow conical reflector 320.

Thermal management of the illuminator is not substantially affected by the presence of hollow conical reflector 320 and spherical mirror 340 because these structures do not displace a large volume. The interior of hollow conical reflector 320 is hollow. And this interior can be effectively cooled via convection through the aperture defined by the first end of the hollow conical reflector 320.

Spherical mirror 340 has an input end and an output end. The input end is closer to light source 330 than the output end. The output end of spherical mirror 340 is connected to, and preferably coextensive with, the first end of hollow conical reflector 320.

Given the parameters of the shape of a particular extended source, as well as the shape and relative position of a particular optical output coupler, the geometric shape of the elliptical, hollow conical and spherical reflectors can be optimized away from ideal geometrical shapes to maximize the efficiency of coupling and/or optical performance. Thus, the reflective elements described herein can be termed quasi-elliptical, quasi-conical and quasi-spherical, respectively. Such nomenclature defines reflector shapes that deviate from geometric ideals less than approximately 10%, and preferably less than 5%, due to performance and efficiency design factors and manufacturing as well as assembly tolerances. Further, the reflective elements described herein can be termed nonelliptical, nonconical and aspherical. Such nomenclature defines reflector shapes that deviate from geometric ideals more than approximately 5%, due to the above-mentioned factors and tolerances.

Figure 6:
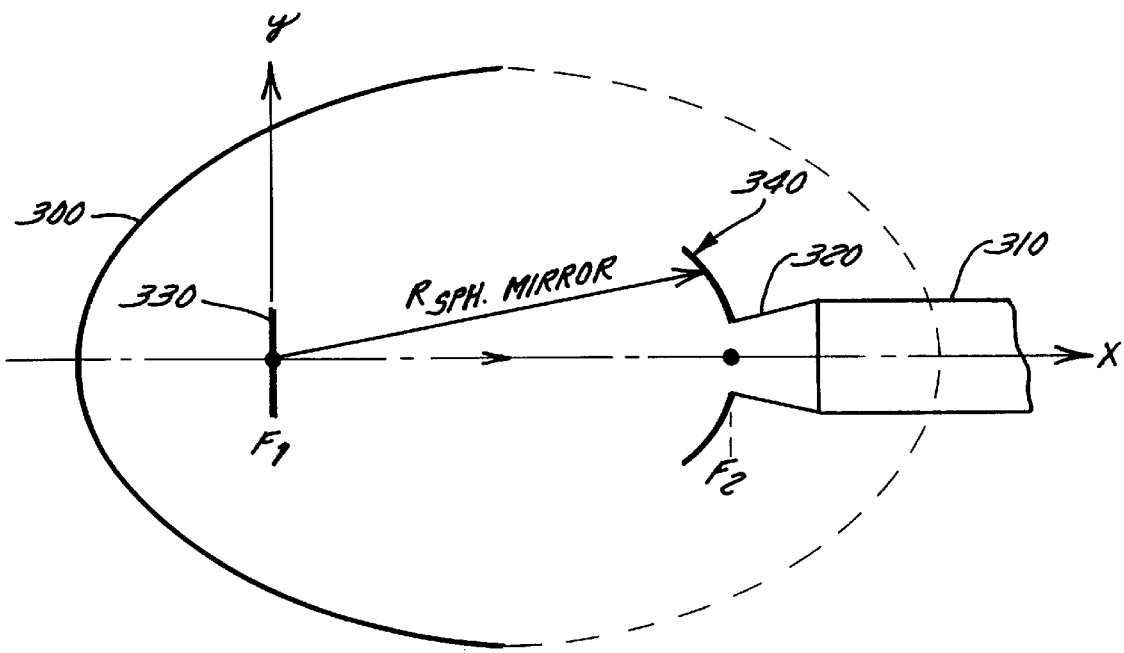
FIG. 6 illustrates a second schematic cross sectional view of the embodiment of the invention shown in FIG. 5.

Referring now to FIG. 6, the radius R of the spherical mirror 340 is defined with regard to the first focus of the elliptical reflector. Although spherical mirror 340 is described as spherical, a quasi-spherical, or aspherical, mirror would be interchangeable with, and the equivalent structure thereof, provided that such a mirror were designed to harvest light that would otherwise pass beyond the first end of hollow conical reflector 320. Similarly, although hollow conical reflector 320 is described with the term conical, a nonconical, or quasi-conical hollow mirror would be interchangeable with and the structural equivalent thereof so long as such a mirror provided the function of injecting light into optical fiber 310 in accordance with the Liouville Theorem. Similarly, although elliptical reflector 300 is described with the term elliptical, a nonelliptical, or quasi-elliptical mirror would be interchangeable with, and the structural equivalent thereof, provided that such a mirror defined first and second focal zones.

Elliptical Reflector Parameters and Hollow Conical Reflector Parameters

Figure 7:
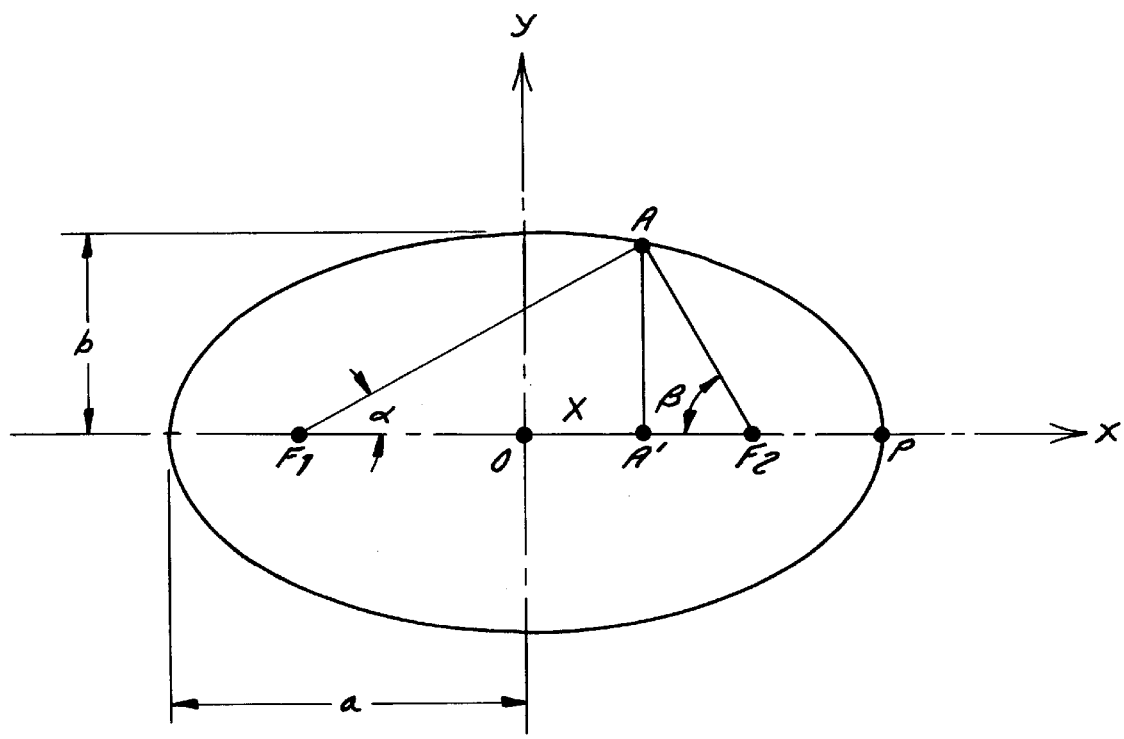
FIG. 7 illustrates a geometrical analysis of an ellipse according to the present invention.

Referring now to FIG. 7, the elliptical reflector is a portion of the perimeter defined by major radius a and minor radius b. The eccentricity of this ellipse will be $$\epsilon = (1-b^2/a^2)^{1/2},$$

and the distance between focal points $F_1$ and $F_2$ will be $F_1F_2 = 2a\epsilon$. Assume that a point source of light is at focal point $F_1$ of this reflector, and that the optical output coupler is mounted at focal point $F_2$. Assuming there is no coupling of directly incident light, the value of the solid angle in which light will be lost is determined by angle $\alpha$ in FIG. 7. The overall solid angle (i.e., of a complete sphere) is $4\pi$ steradian (sr). Light is lost in the solid angle $2\pi(1-\cos\alpha)$. The real relative loss in light energy is designated as W where:

$$W = \frac{2\pi(1-\cos\alpha)}{4\pi} = \frac{1-\cos\alpha}{2}. \tag{1}$$

Further, the segment OA' is designated as X, so that $$\cos\alpha = \frac{F_1A'}{F_1A} = \frac{F_1O+X}{F_1A} = \frac{a\epsilon+X}{a+\epsilon X}, \tag{2}$$

where $F_1A = a+\epsilon X$. Thus, the light loss W will be $$W = \frac{1 - \frac{a\epsilon+X}{a+\epsilon X}}{2} = \frac{a+\epsilon X - a\epsilon - X}{2(a+\epsilon X)} = \tag{3}$$

$$\frac{a(1-\epsilon) - X(1-\epsilon)}{2(a+\epsilon X)} = \frac{(1-\epsilon)(a-X)}{2(a+\epsilon X)}.$$

When X=a, all light is collected, since it follows from Eq. (3) that W=O. When X=−a, all light is lost and in Eq. (3) W=1. When X=−a, $$W = \frac{(1-\epsilon)(a+a)}{2(a-\epsilon a)} = \frac{2a(1-\epsilon)}{2a(1-\epsilon)} = 1. \tag{4}$$

The beam of light incident at the coupler end is determined by $$\cos\beta = \frac{A'F_2}{AF_2} = \frac{a\epsilon - X}{a - \epsilon X}, \tag{5}$$

because $AF_2 = a - \epsilon X$. The characteristic of the incident light is $$\sin\beta = \left[1 - \frac{(a\epsilon-X)^2}{(a-\epsilon X)^2}\right]^{1/2} = \frac{[(a^2-X^2)(1-\epsilon^2)]^{1/2}}{(a-\epsilon X)}. \tag{6}$$

If X=a$\epsilon$, the position of point A' coincides with that $F_2$ of:

$$\sin\beta = [(a^2-a^2\epsilon^2)(1-\epsilon^2)]^{1/2}/(a-\epsilon^2 a) = a(1-\epsilon^2)/a(1-\epsilon^2) = 1. \tag{7}$$

As noted earlier, increasing the value of $\beta$ over that of the optical output coupler numerical aperture (NA) increases light loss.

Figure 8A:
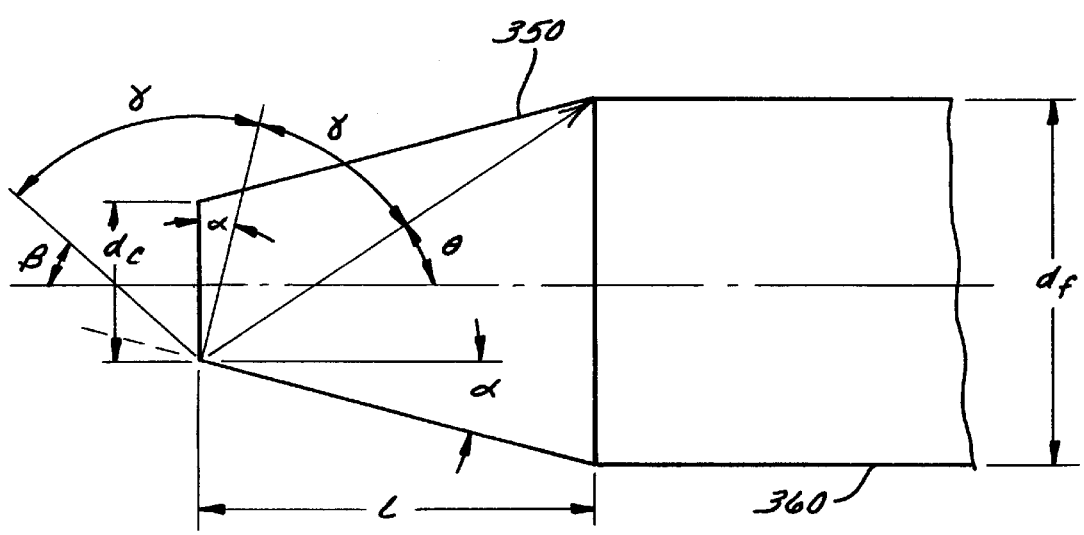
FIG. 8A illustrates a schematic cross sectional view of a hollow conical reflector and an optical output coupler according to the present invention.

Referring to FIG. 8A, the operation of the invention will be better appreciated. Hollow conic reflector 350 is mechanically connected to optical coupler 360.

Assume that the NA of the coupler at the right in FIG. 8A is $\sin\theta$. It follows from FIG. 8A and Snell's law that $$\theta = 90° - \gamma - \alpha, \gamma = 90° - \beta - \alpha \text{ and } 2\alpha = \beta - \theta. \tag{8}$$

If $d_f$ is the coupler diameter, the length L of the hollow conical reflector is $$L \cdot tg\theta + L tg\alpha = d_f, \tag{9}$$

$$L = d_f/(tg\theta + tg\alpha)$$

so the entrance aperture $d_c$ of the hollow conical reflector (the entrance diameter) is $$d_c = d_f - 2tg\alpha \cdot L. \tag{10}$$

If the conical reflector's index of refraction n≠1, (i.e., the conical reflector is not hollow), $\beta'$ and $\theta'$ can be used in place of $\beta$ and $\theta$ so that:

$$\sin\beta' = \sin\beta/n; \sin\theta' = \sin\theta/n, \tag{11}$$

where n is refractive index of the material.

Figure 8B:
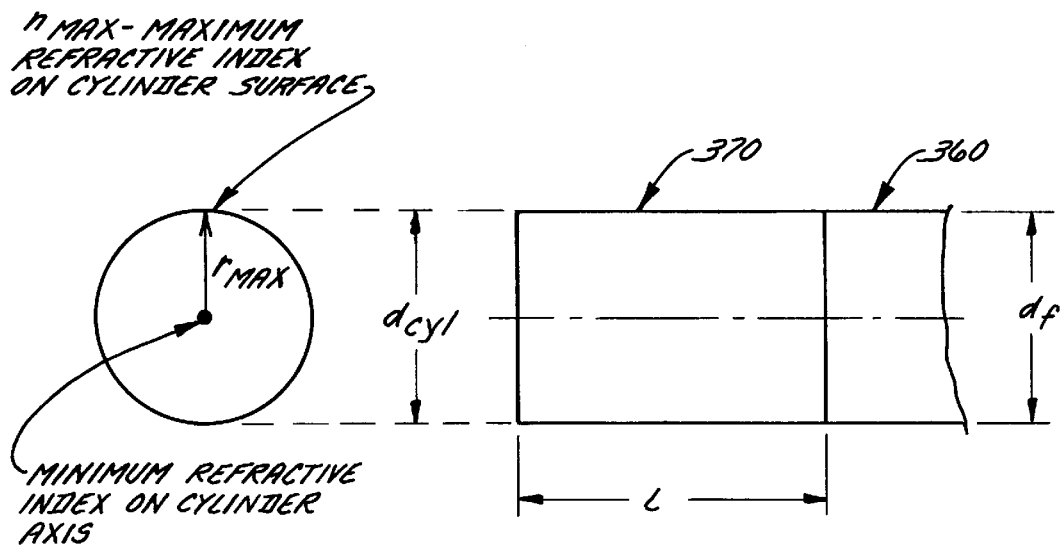
FIG. 8B illustrates two views of a hollow conical reflector and an optical output coupler according to the present invention.

Referring now to FIG. 8B the solid conical reflector with constant refractive index material is replaced by cylindrical reflector 370 with radiant gradient refractive index, which is mechanically connected to optical coupler 360. In the case where the refractive index of the cylindrical reflector changes as a linear function of cylinder radius, it can be described by the formula $$n(r) = n_{max} - a\left(1 - \frac{r}{r_{max}}\right) \tag{12}$$

where r is the variable radius, $r_{max}$ is the radius of the cylindrical reflector, $n_{max}$ is the refractive index of the material on the surface of the cylindrical reflector, $a = (n_{max} - n_{min})$ is a constant and $n_{min}$ is the refractive index of the material at the axis of the cylindrical reflector.

Figure 8C:
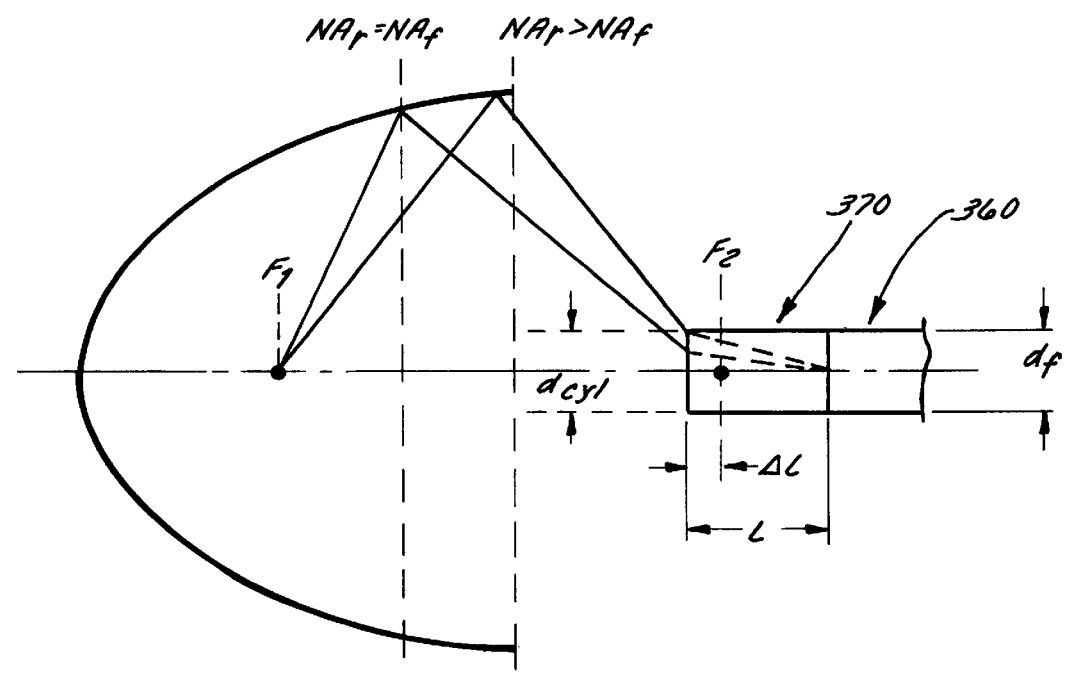
FIG. 8C illustrates a schematic cross sectional view of an illuminator that includes the device shown in FIG. 8B.

Referring now to FIG. 8C, the first end of the solid cylindrical reflector with radiant gradient refractive index material is located between the first and second focal points of the elliptical reflector at a defocusing distance $\Delta L$ from the second focal point of the elliptical reflector. Because of the difference in refractive index, a beam with a numerical aperture higher than the numerical aperture of the optical coupler will be coupled in a manner similar to the case shown in FIG. 3.

Where the optical coupler's numerical aperture is $N_{Af} = 0.5$; $d_{cyl} = d_f = 10$ mm; length of cylinder reflector L=11.23 mm; defocusing length $\Delta L = 3.36$ mm; maximum refractive index $n_{max} = 1.73$; and the minimum refractive index $n_{min} = 1.50$ all rays within the numerical aperture of from 0.5 to 0.83 will be coupled into the optical fiber.

Extended Light Source

Figure 9:
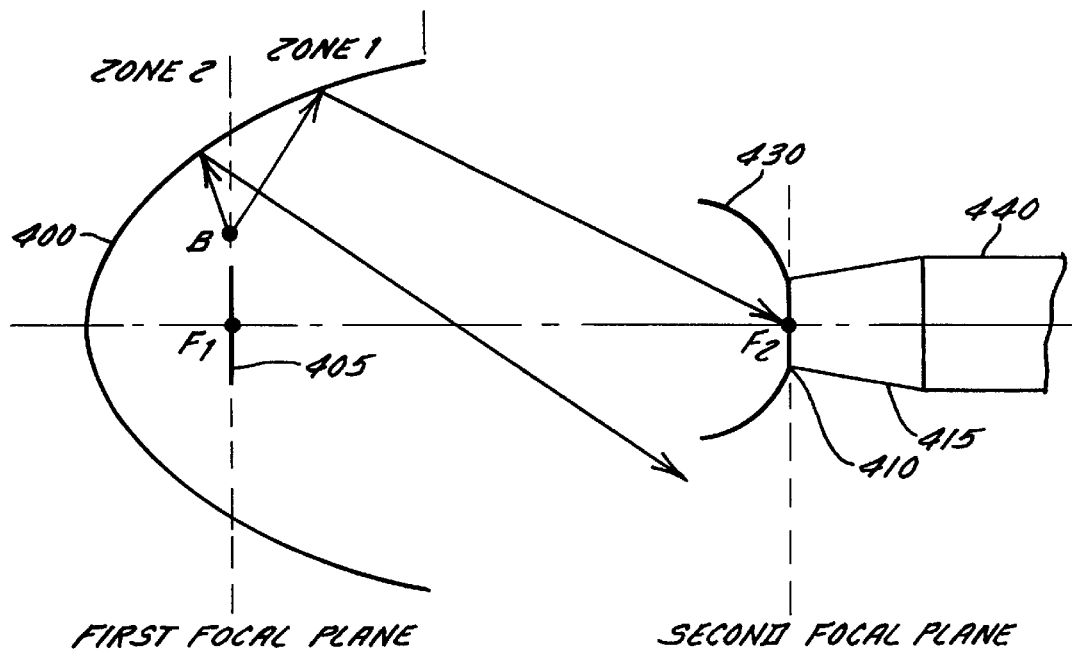
FIG. 9 illustrates a schematic cross sectional view of a fourth embodiment of an illuminator having a hollow conical reflector and a spherical reflector according to the present invention.

If instead of a point of light source an extended linear light source is used, the optical design becomes more complicated. Nevertheless, we now change our assumption from a point source to an extended light source with a height, for example, of ±3 mm. Referring now to FIG. 9, an elliptical reflector 400 with extended light source 405 is shown.

Extended light source 405 is positioned near, or at, the first focal point $F_1$ of elliptical reflector 400. The junction between hollow conical reflector 415 and spherical reflector 430 is located near, or at, the second focal point $F_2$ of elliptical reflector 400. Rays from the point $F_1$ of the light source 405 that is at the axis of the elliptical reflector are incident at the entrance aperture 410 of the hollow conical reflector 415 without aberration. In contrast, all the rays from field point B of the light source are incident at the entrance aperture of the hollow conical reflector with some lateral aberration. Ray tracing shows the elliptical reflector 400 introduces significant lateral aberration along Zone 2 for rays from point B, so that such rays may not enter the hollow conical reflector.

To avoid this energy loss, a spherical reflector 430 can be provided, in which the apex of the spherical surface coincides with the second focus point $F_2$ of the elliptical reflector. Spherical reflector 430 can be connected to hollow conical reflector 415 as a separate component. Alternatively, spherical reflector 430 can be integrally formed with reflector 415. In either event, reflector 415 is optically coupled to coupler 440. FIG. 9 shows an approach to avoiding energy loss for a light source, coupler and elliptical reflector with the parameters shown in the first three sections of Table I.

TABLE I

System Parameters

| Component | Parameters | |
| --- | --- | --- |
| 1. Light Source | h = ± 3 mm linear source, height of the source | |
| 2. Coupler | NA = 0.5   numerical aperture | |
| | $d_f$ = 10.4 mm   entrance aperture | |
| 3. Elliptical Reflector | $r_0$ = 28.4061 mm radius at the apex | |
| | $\epsilon$ = 0.636498   eccentricity | |
| | (a = 47.752 mm; b = 36.830 mm) | |
| 4. Conical Reflector | @ $NA_{ell}$ = 0.77 | @ $NA_{ell}$ = 0.83 |
| | entrance aperature | |
| | $d_c$ = 5.84 mm | $d_c$ = 5 mm |
| | length | |
| | $l_c$ = 23 mm | $l_c$ = 21.78 mm |
| | conic angle | |
| | $\alpha$ = 5.66° | $\alpha$ = 7.07° |
| 5. Spherical Reflector | $R_{sph} \approx$ 64 mm | $R_{sph} \approx$ 64 mm |
| | $h_e$ - light height | $h_e$ min = 12 mm |

Figure 10:
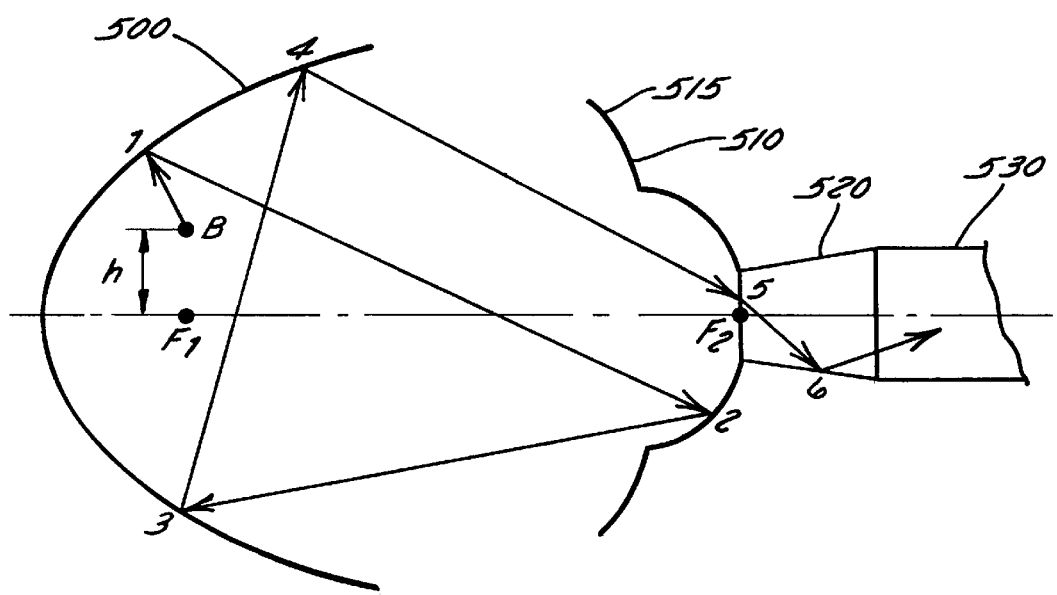
FIG. 10 illustrates a first schematic cross sectional view of a fifth embodiment of an illuminator having a hollow conical reflector and a two-stage spherical reflector according to the present invention.

Referring now to FIG. 10, a light collecting system with conical and spherical reflectors is shown. Once again, an extended source is located at, or near, a first focal point $F_1$ of elliptical reflector 500. A junction between a hollow conical reflector 520 and a first order spherical reflector 510 is located at, or near, a second focal point $F_2$ of elliptical reflector 500. In this embodiment, a second order spherical reflector 515 is operably connected to first order spherical reflector 510. The illustrated beam tracing shows the path of light from the extended source that is emitted in the negative direction.

A ray from a field point of the source that is incident at zone 2 of the elliptical reflector 500 at point 1 is incident on spherical reflector 510 with large lateral aberration about 5.35 mm, at point 2, beyond the entrance aperture of hollow conical reflector 520. This ray is then reflected by spherical mirror 510, which has a radius of 64 mm, is reflected twice by the elliptical reflector 500 at points 3 and 4, and is incident at the hollow conical reflector 520 with moderate lateral aberration of 2.61 mm, (point 5 in FIG. 10), and after reflection at point 6 within the hollow conical reflector 520 enters coupler 530. Second order spherical mirror 515 further increases efficiency in an analogous manner by increasing the range of position of point 2.

Figure 11:
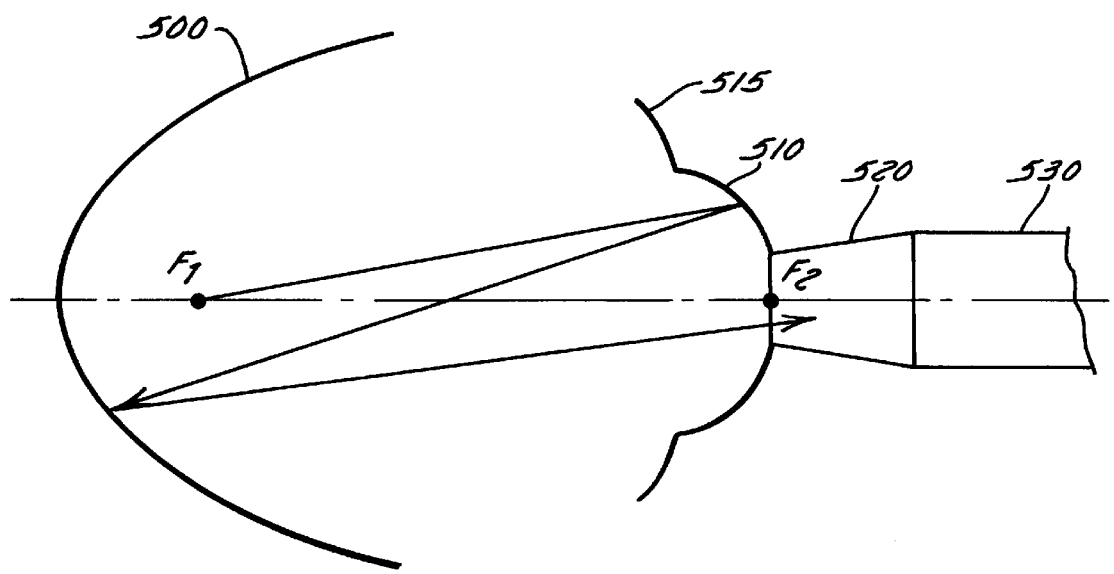
FIG. 11 illustrates a second schematic cross sectional view of the embodiment of the invention shown in FIG. 10.

Referring now to FIG. 11, a beam tracing showing reflection of direct light by spherical mirror 510 is shown. It will be appreciated that the additional mirrors collect more light from positive directions also. Without a spherical mirror, beams emitted close to the optical axis can miss the coupler. The additional mirrors reflect such beams back to the elliptical reflector 500.

The above discussed, and other, illuminators in accordance with the present invention can be assembled in the following manner. To provide a first subassembly, the elliptical reflector and the light source are provided, aligned and operably connected to one another. This operable connection can be made by fusing the light source to a portion of the elliptical reflector such that electrical power leads to the light source are routed through the elliptical reflector. To provide a second subcomponent, the output coupler, the hollow conical reflector and the first order spherical reflector are provided, aligned and operably connected to one another. The hollow conical reflector and the first order spherical reflector can be provided as integral elements of a monolithic reflector or as separate parts. In the later case, the first order spherical reflector needs to be aligned and connected to the hollow conical reflector. Having provided the two above discussed subcomponents, these subcomponents are then assembled by aligning the output coupler with the elliptical reflector and mechanically connecting the output coupler to the elliptical reflector.

Figure 12:
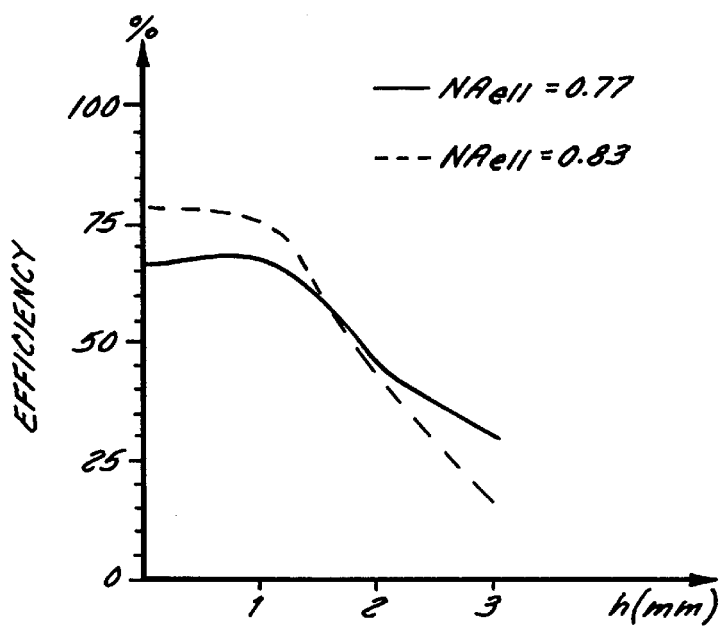
FIG. 12 illustrates efficiency as a function of extended source half-length for elliptical reflectors of two numerical apertures according to the present invention.

Referring now to FIG. 12, the efficiency of the proposed device for elliptical reflector numerical apertures of 0.77 (solid line) and 0.83 (dashed line) is shown. FIG. 12 charts the efficiency of the proposed system using an extended light source.

FIG. 12 illustrates the unexpected advantageous result that high efficiency is maintained for a range of extended source half-heights well above 1 mm. The optimal radius of the spherical reflector was determined for two cases. In these cases the numerical apertures of the elliptical reflectors were 0.77 and 0.83. The parameters of the hollow conical reflector in accordance with Eqs. (9) and (10) are shown for both cases in Table I. The results of the calculations for four corresponding spherical reflector radii are shown in Table II. The results demonstrate the unexpected advantageous result that the optimal radius depends only on such parameters of the elliptical reflector as the radius of the apex and the eccentricity. The spherical mirror is independent of the numerical aperture. This is clear, because the spherical mirror compensates for aberrations in zone 2 of the elliptical reflector in FIG. 9, and is independent of the position of point A in FIG. 7, which is responsible numerical aperture of the elliptical reflector.

TABLE II

Percentage of Source Light Entering Coupler

| | | Proposed System | | | |
| --- | --- | --- | --- | --- | --- |
| 1 | | $NA_{ell}$ = 0.77 | | $NA_{ell}$ = 0.83 | |
| Height of the source h (mm) | 2 Mirror $R_{sph}$ | For a point of the source | Overall | For a point of the source | Overall |
| 0 | N/A | 66 | 66 | 78 | 78 |
| 1 | N/A | 68 | 67 | 77 | 77.5 |
| 1.5 | 73 | 60 | 64.6 | 62 | 72.3 |
| | 68 | 60 | 64.6 | 61 | 72 |
| | 64 | 61 | 65 | 61 | 72 |

TABLE II-continued

Percentage of Source Light Entering Coupler

| | | | Proposed System | | |
|---|---|---|---|---|---|
| 1 | | $NA_{ell} = 0.77$ | | $NA_{ell} = 0.83$ | |
| Height of the source h (mm) | 2 Mirror $R_{sph}$ | For a point of the source | Overall | For a point of the source | Overall |
| | 61 | 58 | 64 | 60 | 71.6 |
| 2 | 73 | 47 | 60.2 | 46 | 65.7 |
| | 68 | 47 | 60.2 | 46 | 65.5 |
| | 64 | 46 | 60.2 | 46 | 65.5 |
| | 61 | 45 | 59.2 | 45 | 65 |
| 2.5 | 73 | 37 | 55.6 | 26 | 57.8 |
| | 68 | 37 | 55.6 | 27 | 57.8 |
| | 64 | 38 | 55.8 | 31 | 58.6 |
| | 61 | 36 | 54.6 | 31 | 58.2 |
| 2.9 | 73 | 26 | 50.6 | 15 | 50.6 |
| | 68 | 28 | 51 | 15 | 50.6 |
| | 64 | 30 | 51.5 | 16 | 51.5 |
| | 61 | 29 | 50.3 | 18 | 51.2 |

The term "Height" in the phrase "Height of the source h(mm)" in Table II is defined to be distance of the point from the optical axis of the elliptical reflector. It will be appreciated from Table II that the optimal radius of the spherical reflector is 64 mm for an h value of 1.5 mm. For a source with a height of 1.5 mm the efficiency gain due to the spherical reflector is approximately 7%. Table II shows that, for this 1.5 mm half height source, increasing the NA of the elliptical reflector reduces efficiency for the field points. This is the result of reducing the entrance aperture of the hollow conical reflector, which compensates in this way for a greater NA of the incident rays, as shown in Table I. Specifically, the $d_{con}$ of the hollow conical reflector in case of $NA_{ell}$=0.77 is 5.84 mm, and $d_c$ for $NA_{ell}$=0.83 is 5 mm. As $d_c$ is reduced, more energy from the field points of the source is lost.

The efficiency of the proposed system with a spherical mirror with optimal radius of 64 mm is shown in Table III. The results presented in Table III unexpectedly advantageously, show that, for a point source, by using a complex conical-spherical reflector the overall efficiency of the system can be increased from 42% for a conventional coupling design to 66% for an NA=0.77 elliptical reflector, and to 78% for $NA_{ell}$=0.83. Increasing the size of the light source reduces efficiency, but with apparatus according to the invention it does not fall below 51% Further, the invention has unexpectedly increased the overall efficiency of the system by about 20%. There is an optimal $NA_{ell}$ for an elliptical reflector. Assuming a dimension of 6 mm the elliptical reflector with an aperture of 0.77 would be selected on the grounds of improving thermal management and simplifying temperature control.

TABLE III

Integrated (Overall) Coupling Efficiency as a Function of Source Linear Dimension

| Physical Dimension of Linear Light Source | Conventional | Proposed system (%) | |
|---|---|---|---|
| (mm) | Coupling (%) | $NA_{ell}$ 0.77 | $NA_{ell}$ 0.83 |
| 0 | 42 | 66 | 78 |
| 2 | 42 | 67 | 77.5 |

TABLE III-continued

Integrated (Overall) Coupling Efficiency as a Function of Source Linear Dimension

| Physical Dimension of Linear Light Source | Conventional | Proposed system (%) | |
|---|---|---|---|
| (mm) | Coupling (%) | $NA_{ell}$ 0.77 | $NA_{ell}$ 0.83 |
| 3 | 41.3 | 65 | 72 |
| 4 | 38.7 | 60.2 | 65.5 |
| 5 | 35.8 | 55.8 | 58.6 |
| 6 | 33.2 | 51.5 | 51.5 |

Figure 13A:
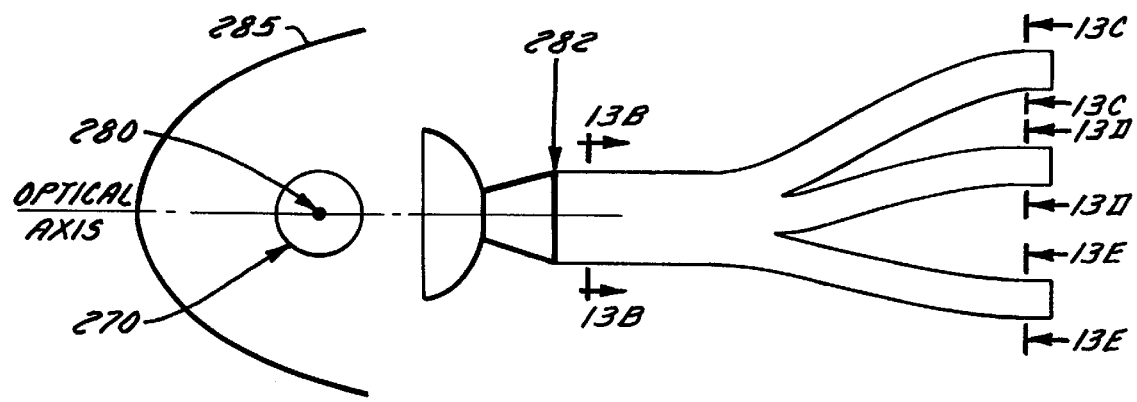
FIGS. 13a–13e illustrate schematic views of a first embodiment of a remote lighting system according to the present invention.

Referring now to FIG. 13a, the illuminator can be combined with a fiber optic coupler-splitter (FOCS). Although the present invention is fully suitable for use with a single light pipe and a single beam transformer, unexpectedly improved results are obtained when multiple beamformers are powered by a single light source. The copuler-splitter functions as a means for distributing the light from the light source. The coupler-splitter can be a fiber optic coupler-splitter, a prismatic beam splitter or any other device suitable for spatially modulating the energy from the light source.

Still referring to FIG. 13a, a fiber optic coupler-splitter (FOCS) 600 for use with the present invention is depicted. Light source 270 is located at the primary focal point 280 of elliptical reflector 285. An input end of FOCS 600 is located in the output plane of hollow conical reflector 282 perpendicular to reflector 285 and the hollow conical reflector axis.

The output end of FOCS 600 is split in number of branches and each branch can be connected to a light pipe. Depending on light distribution in the plane of secondary focal point 282, the number of branches, and the required intensity in each branch, various combinations of small optical fibers from different levels can be used to provide even or non-even illumination in the branches. The FOCS 600 provides unexpectedly high light-source-to-pipe coupling efficiency (e.g., greater than approximately 70%).

Figure 13B:
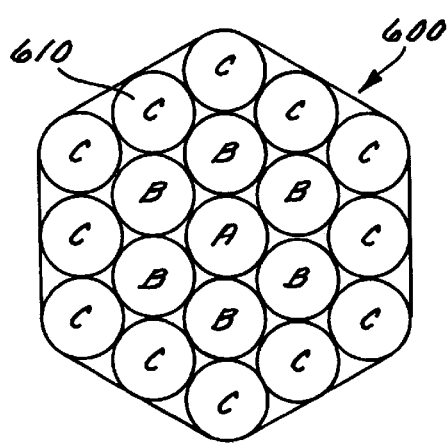

Referring now to FIG. 13b, a cross sectional view of the fiber optic coupler-splitter looking away from the hollow conical reflector is shown. An input end of FOCS 600 includes several levels (i.e., A, B, C) of small diameter optical fibers 610.

Figure 13C:
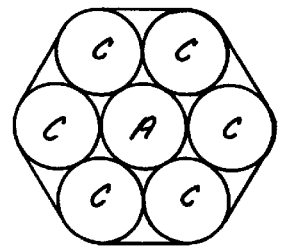

Referring now to FIG. 13c, a cross sectional view of a first branch of the fiber optic coupler-splitter looking toward the hollow conical reflector is shown. This branch of the fiber optic coupler-splitter includes the center fiber of the trunk branch and six perimeter fibers from the trunk branch.

Figure 13D:
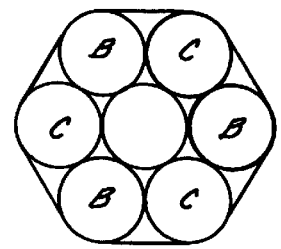

Referring now to FIG. 13d, a cross sectional view of a second branch of the fiber optic coupler-splitter is shown looking toward the hollow conical reflector. This branch includes three intermediate positioned fibers from the trunk branch and three perimeter fibers from the trunk branch.

Figure 13E:
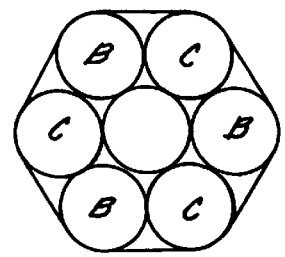

Referring now to FIG. 13e, a cross sectional view of a third branch of the fiber optic coupler-splitter is shown looking toward the hollow conical reflector. This branch includes three intermediate position fibers from the trunk and three perimeter position fibers from the trunk.

Figure 14:
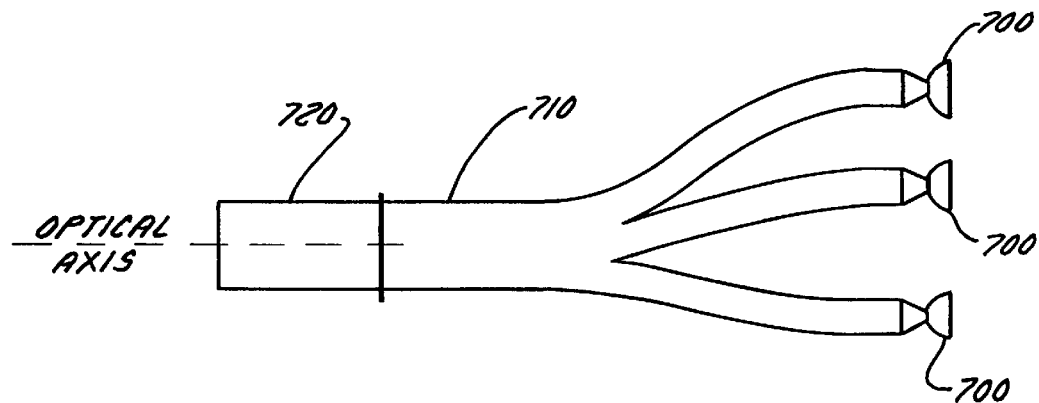
FIG. 14 illustrates a schematic view of a second embodiment of a remote lighting system according to the present invention.

Referring now to FIG. 14, a plurality of illuminators 700 are connected to a fiber optic coupler-splitter 710 in accordance with an alternative configuration of the invention. This configuration permits a higher combined output to a single optic coupler 720 than is possible with a single illuminator.

Figure 15:
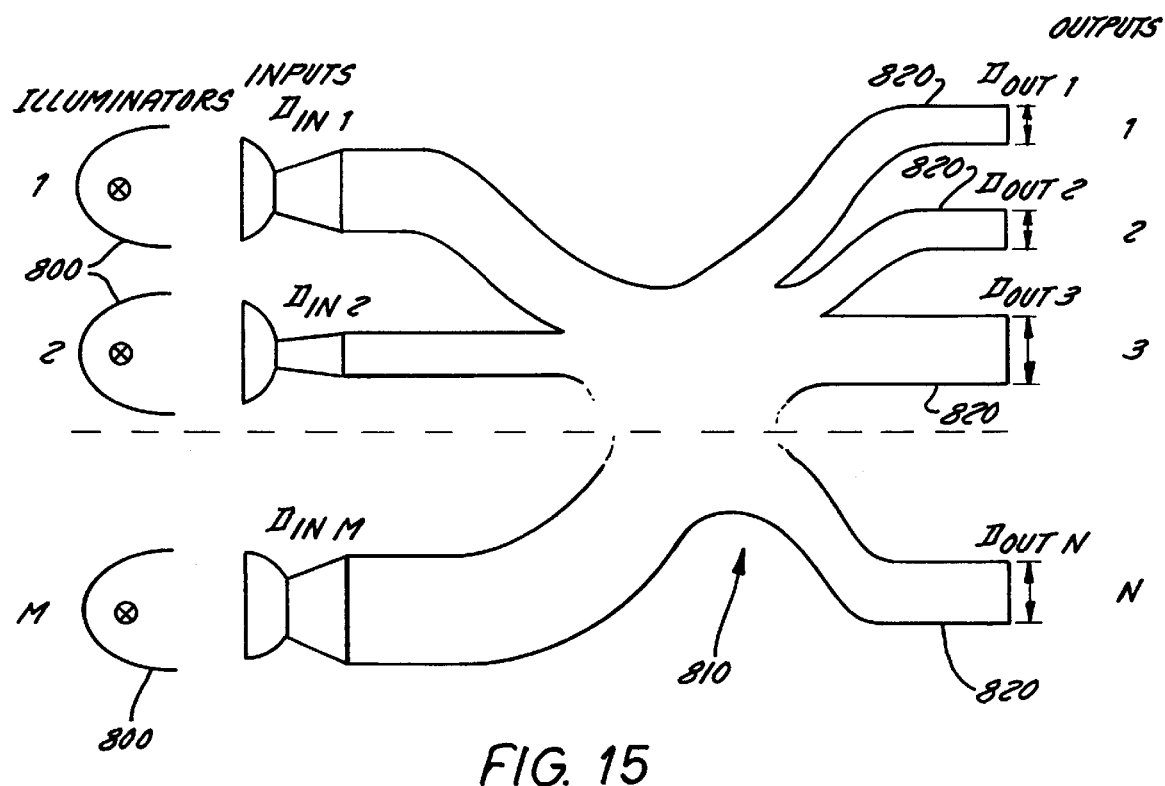
FIG. 15 illusrates a schematic view of a third embodiment of a remote lighting system according to the present invention.

Referring now to FIG. 15, a plurality of illuminators 800 are connected to fiber optic coupler-splitter 810 in accordance with the general configuration of the invention. This universal configuration permits a number of illuminator inputs to be combined into the plurality of branch 820 outputs.

Assuming that the fiber optic coupler-splitter consists of n small diameter d optical fibers combined in M inputs and N outputs, the general equation can be described as:

$$n = \sum_{i=1}^{i=M} n_{in_i} = \sum_{j=1}^{j=N} n_{out_j} \qquad (13)$$

where n is the number of fibers in the coupler-splitter, $n_{in_i}$ is the number of fibers in the "$i^{th}$" input, $n_{out_j}$ is the number of fibers in the "$j_{th}$" output. At the same time two equations must be satisfied:

$$n_{in_i} = \sum_{i;j=1}^{j=N} n_{out_{ij}} \qquad (14)$$

$$n_{out_j} = \sum_{i=1;j}^{i=M} n_{out_{ij}}$$

where $n_{out_{ij}}$ is the number of fibers in the "$j^{th}$" output from the "$i^{th}$" input. The geometrical characteristics of the coupler-splitter can be determined:

$$D_{in_i} = d\sqrt{n_{in_i}} \qquad (15)$$

$$D_{out_j} = d\sqrt{n_{out+di\ j}} \qquad (16)$$

where $D_{in_i}$ is the diameter of the "$i^{th}$" input and $D_{out_j}$ is the diameter of the "$j^{th}$" output.

The invention is not limited to the specific arrangement of waveguides shown and preferred embodiments of the invention can be identified on at a time by selecting symmetric inputs and outputs of various configurations.

The particular manufacturing process used for assembling the components of the illuminator should be precise and accurate. Conveniently, the assembly of the present invention can be carried out by using any joining method. It is preferred that the process be fusion bonding. For the manufacturing operation, it is moreover an advantage to employ an automated method.

However, the particular manufacturing process is not essential to the present invention as long as it provides the described transformation. Normally the manufacturers of this product will select the manufacturing process as a matter of design choice based upon tooling and energy requirements, in view of the expected application requirements of the final product and the demands of the overall manufacturing process.

The particular material used for the conical and spherical reflectors should be highly reflective for the wavelengths generated by the source and heat resistant. Conveniently, the conical and spherical reflectors of the present invention can be made of almost any metallic material. It is preferred that the material be aluminum. For the manufacturing operation, it is moreover an advantage to employ a spun aluminum material.

The particular materials used for the fiber optic copuler-splitter should be highly transparent and heat-resistant. It is preferred that glass optical fiber and high temperature epoxy will be used. To avoid overheating inside the coupler-splitter due to light energy absorption, clear high-temperature epoxy with high optical transmittance in the visible range of the optical spectrum is preferable.

However, the particular material selected is not essential to the present invention, so long as it provides the described function. Normally, the manufacturers of this product will select the best commercially available material as a matter of design choice based upon the economics of cost and availability, in view of the expected application requirements of the final product and the demands of the overall manufacturing process.

The disclosed embodiments show an elliptical reflector as the structure for performing the function of primary reflection, but the structure for primary reflection can be any other structure capable of performing the function of initially reflecting the bulk of the light, including, by way of example a quasi-elliptical, a nonelliptical reflector or a compound quasi-elliptical/elliptical or nonelliptical reflector. The present invention is cost effective and economically efficient because coupling efficiency is notably increased while all that is needed are small, simple reflectors.

While not being limited to any particular diagnostic identifier, preferred embodiments of the present invention can be identified one at a time by testing for the presence of high coupling efficiency. The test for the presence of high coupling efficiency can be carried out without undue experimentation by the use of a simple and conventional integrated light intensity experiment. Among the other ways in which to seek embodiments having the attribute of high coupling efficiency, guidance toward the next preferred embodiment can be based on the presence of homogeneity.

The benefits of remote source lighting include high efficiency, reduced power consumption, reduced life-cycle costs, increased ease of use and reduced maintenance and repair, much higher reliability and, optionally, redundancy. The benefits of remote source lighting are clearly of interest to those who light airports, ammunition storage areas, toxic sites, inaccessible areas, signal and warning lights. These advantages include permanent and water tight installation.

Applications where safety or convenience of maintenance are of particular importance are especially good candidates for the use of remote lighting. With the availability of low cost, mass-producible high efficiency illuminators, remote source lighting products will be more affordable and thus able to reach an even wider market.

Practical applications of the present invention which have value within the technological arts are airport lighting, obstruction lighting, task lighting, and marine lighting. Further, all the disclosed embodiments of the present invention are useful in conjunction with specialty light applications such as ship, aircraft, and boat-mast lighting, or for the purpose of environmental control light applications such as cold light in medical operating rooms, high bay lighting, mine area lighting, refinery distillation area lighting, and underwater lighting, or the like. Similarly, safety-related lighting applications are candidates for the use of remote lighting.

As a specific practical application, the Defense Explosive Safety Board currently requires the use of vapor-tight explosion-proof light fixtures in all explosive environments. Whenever a bulb requires replacement, all flammable materials (stored or work-in-process) must be removed from the room and the fixture cleaned with steam to remove explosive particles before bulb replacement. The use of remote source lighting, with the illumination source outside the room, would cut the capital cost of such fixtures. Further, maintenance costs and down time for illumination source replacement would also be reduced.

The same rationale applies to paint booths, which have safety imposed restrictions requiring vapor-tight light fixtures. Again, placing the illumination source outside the booth would eliminate the need to use the expensive fixtures.

In traffic and road signage, replacing bulbs is a major expense because the lighting is usually high overhead and in remote locations, driving maintenance labor costs very high. With remote lighting, the illumination source can be conveniently placed at ground level, eliminating the need for cherry-pickers and other expensive support equipment.

The applications described above have a high probability for adopting remote lighting because of facility safety considerations. For example, the high costs of currently used explosion proof and hazardous area fixtures make remote lighting very attractive for these applications. There are virtually innumerable uses for the present invention described herein, all of which need not be detailed here.

The present invention described herein provides substantially improved results that are unexpected. All the disclosed embodiments of the invention described herein can be realized and practiced using conventional materials, components and subcombinatorial procedures without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the spherical reflector could be enhanced by providing a second order extension around the outer perimeter of the spherical reflector as shown in FIG. 11. Similarly, although aluminum is preferred for the second order extension, any heat resistant reflective material could be used in its place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which cooperate so as to provide improved coupling efficiency. Further, although the illuminator described herein is a physically separate module, it will be manifest that the illuminator may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. W. Wheeler, U.S. Pat. No. 247,229, 1880.
2. Handbook of Optics, 2nd ed., Vols. I–II, McGraw Hill, (Michael Bass et al. eds., 1995).
3. Bahaa E. A. Saleh & Malvin C. Teich, Fundamentals of Photonics, John Wiley & Sons, (1991).
4. Van Nostrand's Scientific Encyclopedia, 8th ed., Van Nostrand Reinhold, (Douglas M. Considine et al. eds., 1995).
5. Mark's Standard Handbook for Mechanical Engineers, 9th ed., McGraw Hill, (Eugene A. Avallone et al. eds., 1987).
6. The Electrical Engineering Handbook, CRC Press, (Richard C. Dorf et al. eds., 1993).

What is claimed is:

1. An apparatus, comprising:
    an elliptical reflector defining a first focal point, a second focal point, a first focal plane and a second focal plane, said first focal point and said second focal point defining a principal axis;
    a light source optically coupled to said elliptical reflector and located substantially at said first focal plane;
    an output coupler optically coupled to said elliptical reflector, said output coupler including a first proximal end and a first distal end, said first proximal end defining an output coupler axis that is substantially coaxial with said principal axis;
    a hollow conical reflector optically coupled to said output coupler, said hollow conical reflector including a first end defining a first aperture and a second end defining a second aperture, said first aperture and said second aperture defining a hollow conical reflector axis, said hollow conical reflector being positioned such that i) said hollow conical reflector axis is substantially coaxial with said principal axis and ii) a plane defined by said first aperture is substantially coincident with said second focal point, said second end of said hollow conical reflector being mechanically connected to said proximal end of said output coupler; and
    a first order spherical reflector optically coupled to said elliptical reflector, said first order spherical reflector including a first order input end defining a first order input aperture and a first order output end defining a first order output aperture, said first order input aperture and said first order output aperture defining a first order spherical reflector axis, said first order spherical reflector being positioned such that i) said first order spherical reflector axis is substantially coaxial with said principal axis and ii) a plane defined by said first order output aperture is substantially coincident with said second focal point, said first order output end of said first order spherical reflector being mechanically connected to said first end of said hollow conical reflector.

2. The apparatus of claim 1, further comprising a second order spherical reflector optically coupled to said elliptical reflector, said second order spherical reflector including a second order input end defining a second order input aperture and a second order output end defining a second order output aperture, said second order input aperture and said second order output aperture defining a second order spherical reflector axis, said second order spherical reflector being positioned such that i) said second order spherical reflector axis is substantially coaxial with said principal axis and ii) a plane defined by said second order output aperture is substantially coincident with a plane defined by said first order input aperture, said second order output end of said second order spherical reflector being mechanically connected to said first order input end of said first order spherical reflector.

3. The apparatus of claim 1, wherein said output coupler includes a fiber optic coupler-splitter.

4. The apparatus of claim 3, wherein said output coupler includes a second distal end.

5. The apparatus of claim 4, further comprising a first beamformer optically coupled to said first distal end and a second beamformer optically coupled to said second distal end.

6. The apparatus of claim 3, wherein said output coupler includes a second proximal end.

7. The apparatus of claim 4, further comprising a beamformer optically coupled to said first distal end and an illuminator optically coupled to said second proximal end.

8. The apparatus of claim 1, wherein an overall efficiency is at least 51%.

9. The apparatus of claim 8, wherein said overall efficiency is at least 65%.

10. An apparatus, comprising:
- an elliptical reflector defining a first focal point, a second focal point, a first focal plane and a second focal plane, said first focal point and said second focal point defining a principal axis;
- an output coupler optically coupled to said elliptical reflector, said output coupler including a first proximal end and a first distal end, said first proximal end defining an output coupler axis that is substantially coaxial with said principal axis, and a diameter of said first proximal end of said coupler defining an input diameter of said output coupler; and
- a hollow conical reflector optically coupled to said output coupler, said hollow conical reflector including a first end defining an first aperture and a second end defining a second aperture, said first aperture and said second aperture defining a hollow conical reflector axis, said hollow conical reflector being positioned such that i) said hollow conical reflector axis is substantially coaxial with said principal axis and ii) a plane defined by said first aperture is substantially coincident with said second focal point, said second end of said hollow conical reflector being mechanically connected to said proximal end of said output coupler, and a diameter of said first aperture of said hollow conical connector defining an input diameter of said hollow conical reflector, said input diameter of said hollow conical reflector being smaller than said input diameter of said output coupler.

11. The apparatus of claim 10, further comprising a light source optically coupled to said elliptical reflector and located substantially at said first focal plane.

12. The apparatus of claim 10, further comprising a first order spherical reflector optically coupled to said elliptical reflector, said first order spherical reflector including a first order input end defining a first order input aperture and a first order output end defining a first order output aperture, said first order input aperture and said first order output aperture defining a first order spherical reflector axis, said first order spherical reflector being positioned such that i) said first order spherical reflector axis is substantially coaxial with said principal axis and ii) a plane defined by said first order output aperture is substantially coincident with said second focal point, said first order output end of said first order spherical reflector being mechanically connected to said first end of said hollow conical reflector.

13. The apparatus of claim 10, further comprising a second order spherical reflector optically coupled to said elliptical reflector, said second order spherical reflector including a second order input end defining a second order input aperture and a second order output end defining a second order output aperture, said second order input aperture and said second order output aperture defining a second order spherical reflector axis, said second order spherical reflector being positioned such that i) said second order spherical reflector axis is substantially coaxial with said principal axis and ii) a plane defined by said second order output aperture is substantially coincident with a plane defined by said first order input aperture, said second order output end of said second order spherical reflector being mechanically connected to said first order input end of said first order spherical reflector.

14. The apparatus of claim 10, wherein an overall efficiency is at least 51%.

15. The apparatus of claim 14, wherein said overall efficiency is at least 65%.

16. The apparatus of claim 10, wherein said output coupler includes a fiber optic coupler-splitter.

17. The apparatus of claim 16, wherein said output coupler includes a second distal end.

18. The apparatus of claim 17, further comprising a first beamformer optically coupled to said first distal end and a second beamformer optically coupled to said second distal end.

19. The apparatus of claim 16, wherein said output coupler includes a second proximal end.

20. The apparatus of claim 19, further comprising a beamformer optically coupled to said first distal end and an illuminator optically coupled to said second proximal end.

21. A method, comprising:
(A) providing an illuminator with
 (1) an elliptical reflector defining a first focal point, a second focal point, a first focal plane and a second focal plane, said first focal point and said second focal point defining a principal axis;
 (2) a light source optically coupled to said elliptical reflector and located substantially at said first focal plane;
 (3) an output coupler optically coupled to said elliptical reflector, said output coupler including a first proximal end and a first distal end, said first proximal end defining an output coupler axis that is substantially coaxial with said principal axis and a diameter of said first proximal end of said coupler defining an input diameter of said output coupler; and
 (4) a hollow conical reflector optically coupled to said output coupler, said hollow conical reflector including a first end defining an first aperture and a second end defining a second aperture, said first aperture and said second aperture defining a hollow conical reflector axis, said hollow conical reflector being positioned such that i) said hollow conical reflector axis is substantially coaxial with said principal axis and ii) a plane defined by said input aperture is substantially coincident with said second focal point, said second end of said hollow conical reflector being mechanically connected to said proximal end of said output coupler, and a diameter of said first aperture of said hollow conical connector defining an input diameter of said hollow conical reflector, said input diameter of said hollow conical reflector being smaller than said input diameter of said output coupler; and
(B) illuminating said light source.

22. The method of claim 21, wherein providing includes providing said illuminator with a first order spherical reflector optically coupled to said elliptical reflector, said first order spherical reflector including a first order input end defining a first order input aperture and a first order output end defining a first order output aperture, said first order input aperture and said first order output aperture defining a first order spherical reflector axis, said first order spherical reflector being positioned such that i) said first order spherical reflector axis is substantially coaxial with said principal axis and ii) a plane defined by said first order output aperture is substantially coincident with said second focal point, said first order output end of said first order spherical reflector being mechanically connected to said first end of said hollow conical reflector.

23. The method of claim 21, further comprising deilluminating the light source; and repeating the steps of illuminating and deilluminating.

* * * * *